United States Patent
Kitamura et al.

(10) Patent No.: US 10,583,517 B2
(45) Date of Patent: Mar. 10, 2020

(54) THREE-DIMENSIONAL LAMINATING AND SHAPING APPARATUS, THREE-DIMENSIONAL LAMENTING AND SHAPING APPARATUS CONTROL METHOD, AND THREE-DIMENSIONAL LAMINATING AND SHAPING APPARATUS CONTROL PROGRAM

(71) Applicant: TECHNOLOGY RESEARCH ASSOCIATION FOR FUTURE ADDITIVE MANUFACTURING, Tokyo (JP)

(72) Inventors: Shinichi Kitamura, Tokyo (JP); Hironobu Manabe, Tokyo (JP)

(73) Assignee: TECHNOLOGY RESEARCH ASSOCIATION FOR FUTURE ADDITIVE MANUFACTURING, Tokyo (JP)

( * ) Notice: Subject to any disclaimer, the term of this patent is extended or adjusted under 35 U.S.C. 154(b) by 641 days.

(21) Appl. No.: 15/122,836

(22) PCT Filed: Mar. 25, 2016

(86) PCT No.: PCT/JP2016/059644
§ 371 (c)(1),
(2) Date: Aug. 31, 2016

(87) PCT Pub. No.: WO2017/163404
PCT Pub. Date: Sep. 28, 2017

(65) Prior Publication Data
US 2018/0147654 A1    May 31, 2018

(51) Int. Cl.
*B23K 15/00*    (2006.01)
*B33Y 30/00*    (2015.01)
(Continued)

(52) U.S. Cl.
CPC ........ *B23K 15/0086* (2013.01); *B22F 3/1055* (2013.01); *B23K 15/0026* (2013.01);
(Continued)

(58) Field of Classification Search
CPC ........... B23K 15/0086; B23K 15/0026; B33Y 10/00; B33Y 30/00; B33Y 40/00; B33Y 50/02; B22F 3/1055; B22F 2003/1056
(Continued)

(56) References Cited

U.S. PATENT DOCUMENTS 6,326,635 B1 * 12/2001 Innes ...................... H01J 37/09
250/505.1
9,162,393 B2    10/2015 Ackelid
(Continued)

FOREIGN PATENT DOCUMENTS

CN    104959724 A    10/2015
JP    7-138741 A    5/1995
(Continued)

OTHER PUBLICATIONS

Supplementary European Search Report (SESR) dated Sep. 21, 2018 in connection with corresponding European Patent Application No. 16 82 5690.7.
(Continued)

*Primary Examiner* — Brian W Jennison
(74) *Attorney, Agent, or Firm* — Ladas & Parry LLP

(57) ABSTRACT

This invention effectively suppresses the generation of scattered electrons such as secondary electrons and backscattered electrons. A three-dimensional laminating and shaping apparatus includes a linear funnel that recoats a material of a three-dimensional laminated and shaped object onto a shaping surface on which the three-dimensional laminated and shaped object is to be shaped. The three-dimensional laminating and shaping apparatus also includes an electron
(Continued)

gun that generates an electron beam. The three-dimensional laminating and shaping apparatus further includes an anti-deposition cover made of a metal and formed between the shaping surface and the electron gun. In addition, the three-dimensional laminating and shaping apparatus includes a DC power supply that applies a positive voltage to the anti-deposition cover.

7 Claims, 10 Drawing Sheets

(51) Int. Cl.
    *B33Y 40/00*         (2020.01)
    *B22F 3/105*         (2006.01)
    *B33Y 10/00*         (2015.01)
    *B33Y 50/02*         (2015.01)

(52) U.S. Cl.
    CPC ............... *B33Y 10/00* (2014.12); *B33Y 30/00* (2014.12); *B33Y 40/00* (2014.12); *B33Y 50/02* (2014.12); *B22F 2003/1056* (2013.01); *Y02P 10/295* (2015.11)

(58) Field of Classification Search
    USPC ........................................................ 219/76.1
    See application file for complete search history.

(56) References Cited

U.S. PATENT DOCUMENTS

| | | | |
|---|---|---|---|
| 9,162,394 B2 | 10/2015 | Ackelid | |
| 2004/0262261 A1* | 12/2004 | Fink | B29C 71/04 216/66 |
| 2007/0145269 A1* | 6/2007 | Buller | B82Y 10/00 250/310 |
| 2009/0042050 A1* | 2/2009 | Matteazzi | B22F 3/008 428/546 |
| 2014/0277671 A1 | 9/2014 | Kronenberg et al. | |
| 2014/0370323 A1 | 12/2014 | Ackelid | |
| 2015/0306700 A1* | 10/2015 | Honda | B23K 15/0086 219/121.17 |
| 2017/0080494 A1 | 3/2017 | Ackelid | |
| 2017/0080495 A1 | 3/2017 | Ackelid | |

FOREIGN PATENT DOCUMENTS

| | | |
|---|---|---|
| JP | 2010-526694 A | 8/2010 |
| JP | 2015-175012 A | 10/2015 |
| WO | 2008/147306 A1 | 12/2008 |
| WO | 2014/170127 A1 | 10/2014 |

OTHER PUBLICATIONS

Espacenet English abstract of CN 104959724 A.
International Search Report (ISR) dated Jun. 21, 2016 for International Application No. PCT/JP2016/059644.
Written Opinion (WO) dated Jun. 21, 2016 for International Application No. PCT/JP2016/059644.
J-PlatPat English abstract of JP 2015-175012 A.
J-PlatPat English abstract of JP 7-138741 A.

* cited by examiner

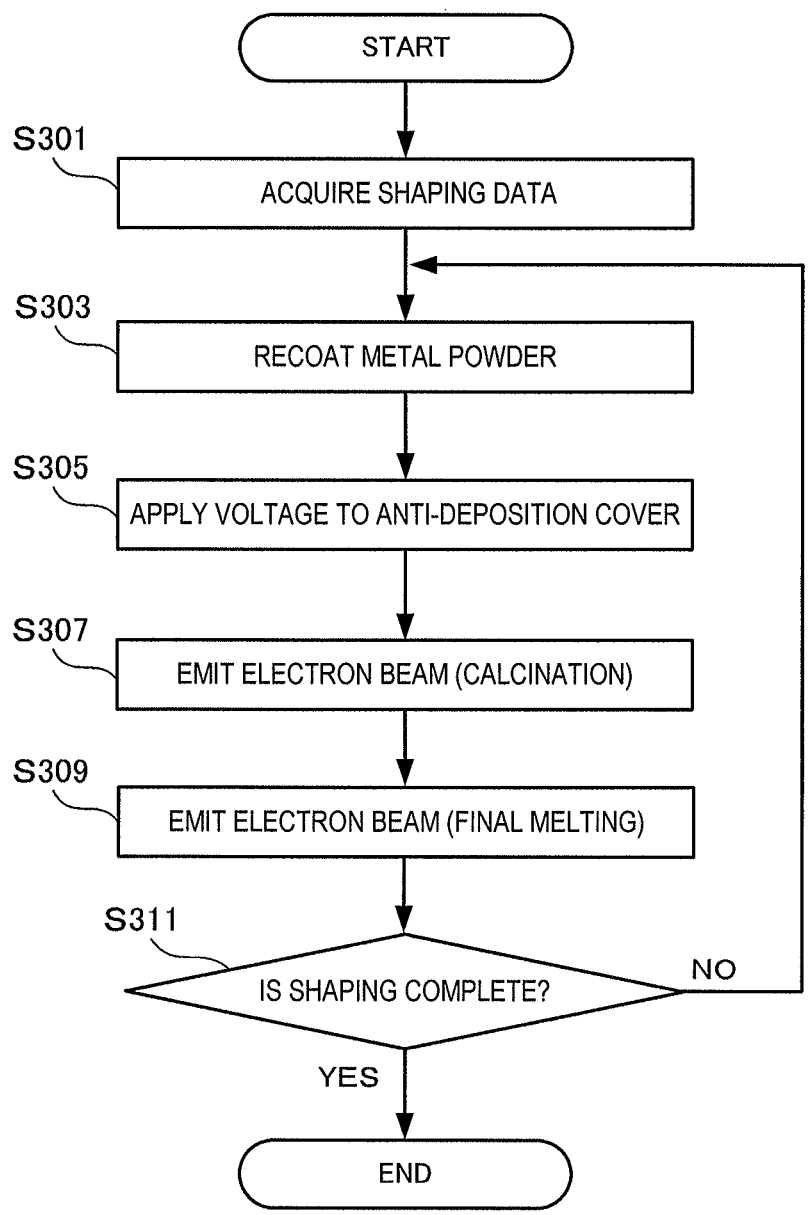
F I G. 3

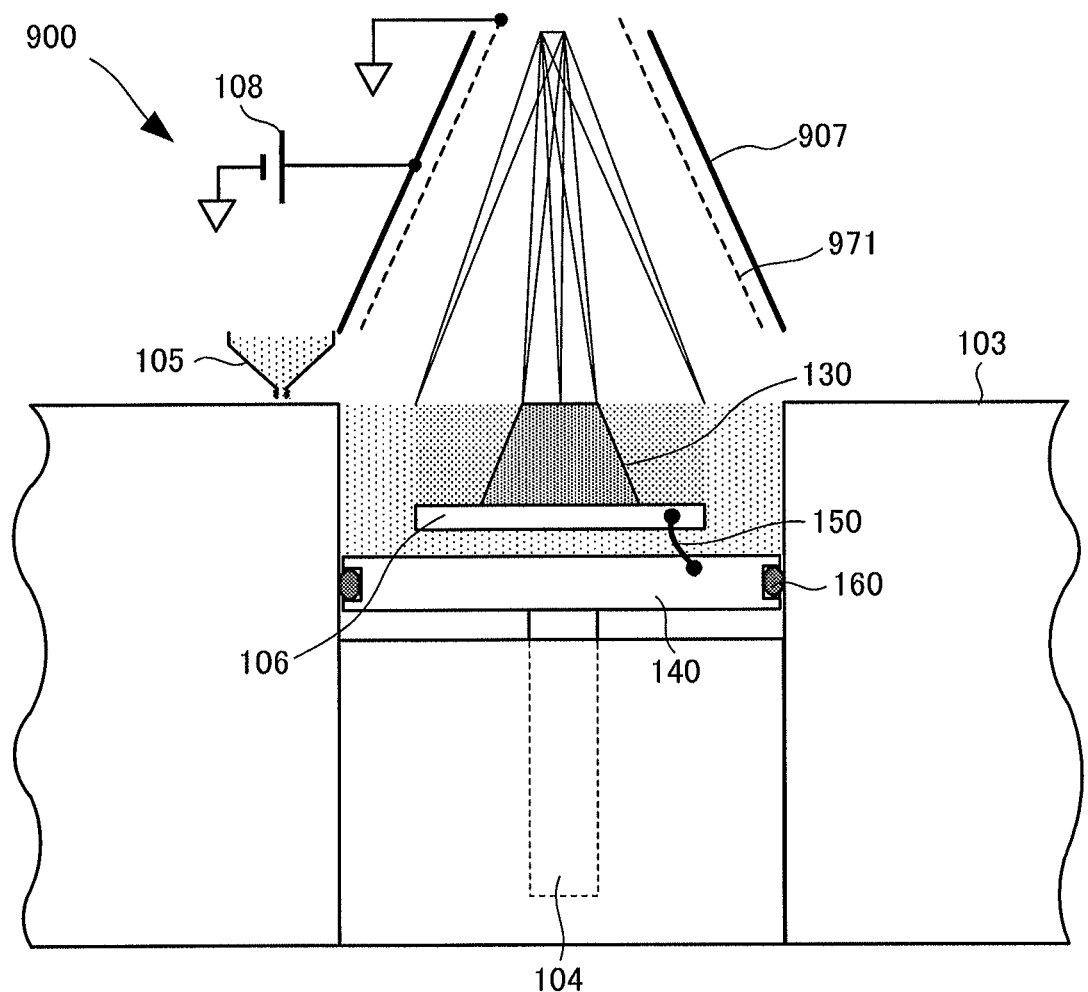
F I G. 9

THREE-DIMENSIONAL LAMINATING AND SHAPING APPARATUS, THREE-DIMENSIONAL LAMENTING AND SHAPING APPARATUS CONTROL METHOD, AND THREE-DIMENSIONAL LAMINATING AND SHAPING APPARATUS CONTROL PROGRAM

RELATED APPLICATION

This application is an application under 35 U.S.C. 371 of International Application No. PCT/JP2016/059644 filed on Mar. 25, 2016, the entire contents of which are incorporated herein by reference.

TECHNICAL FIELD

The present invention relates to a three-dimensional laminating and shaping apparatus, a three-dimensional laminating and shaping apparatus control method, and a three-dimensional laminating and shaping apparatus control program.

BACKGROUND ART

In the abovementioned technical field, patent literature 1 has disclosed a technique of supplying an inert gas as an auxiliary gas into a vacuum chamber.

CITATION LIST

Patent Literature

Patent literature 1: Japanese PCT National Publication No. 2010-526694

SUMMARY OF THE INVENTION

Technical Problem

Unfortunately, the technique described in the abovementioned literature cannot effectively suppress the generation of scattered electrons such as secondary electrons and backscattered electrons.

The present invention enables to provide a technique of solving the above-described problem.

Solution to Problem

One aspect of the present invention provides a three-dimensional laminating and shaping apparatus comprising:
 a material recoater that recoats a material of a three-dimensional laminated and shaped object onto a shaping surface on which the three-dimensional laminated and shaped object is to be shaped;
 an electron gun that generates an electron beam;
 a metal cover formed between the shaping surface and the electron gun; and
 an application unit that applies a positive voltage to the cover.

Another aspect of the present invention provides a three-dimensional laminating and shaping apparatus control method comprising:
 causing a material recoater to recoat a material of a three-dimensional laminated and shaped object onto a shaping surface on which the three-dimensional laminated and shaped object is to be shaped;
 causing an electron gun to generate an electron beam; and
 applying a positive voltage to a metal cover formed between the shaping surface and the electron gun.

Still another aspect of the present invention provides a three-dimensional laminating and shaping apparatus control program for causing a computer to execute a method, comprising:
 causing a material recoater to recoat a material of a three-dimensional laminated and shaped object onto a shaping surface on which the three-dimensional laminated and shaped object is to be shaped;
 causing an electron gun to generate an electron beam; and
 applying a positive voltage to a metal cover formed between the shaping surface and the electron gun.

Advantageous Effects of Invention

The present invention can effectively suppress the generation of scattered electrons such as secondary electrons and backscattered electrons.

BRIEF DESCRIPTION OF DRAWINGS

FIG. 3 is a flowchart for explaining the procedure of the three-dimensional laminating and shaping apparatus according to the first embodiment of the present invention;

FIG. 9 is a partially enlarged view showing the arrangement of an anti-deposition cover of a three-dimensional laminating and shaping apparatus according to the fifth embodiment of the present invention.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

A three-dimensional laminating and shaping apparatus 100 according to the first embodiment of the present invention will be explained with reference to FIG. 1. The three-dimensional laminating and shaping apparatus 100 is a powder bed type apparatus. The three-dimensional laminating and shaping apparatus 100 irradiates a material spread on a shaping surface by a recoater or the like with an electron beam, thereby melting the material, solidifying the material, and completing laminating of one layer of the material. When completing the laminating of one layer, the three-dimensional laminating and shaping apparatus 100 moves down a shaping table by a height equivalent to the height of one layer, and spreads (recoats) the material of the next layer by the recoater or the like. After spreading the material, the three-dimensional laminating and shaping apparatus 100 irradiates the material with the electron beam, thereby melting the material, solidifying the material, and completing laminating of the material of the next one layer. The three-dimensional laminating and shaping apparatus 100 shapes a desired three-dimensional laminated and shaped object by repeating this operation.

<Technical Premise>

Figure 4:
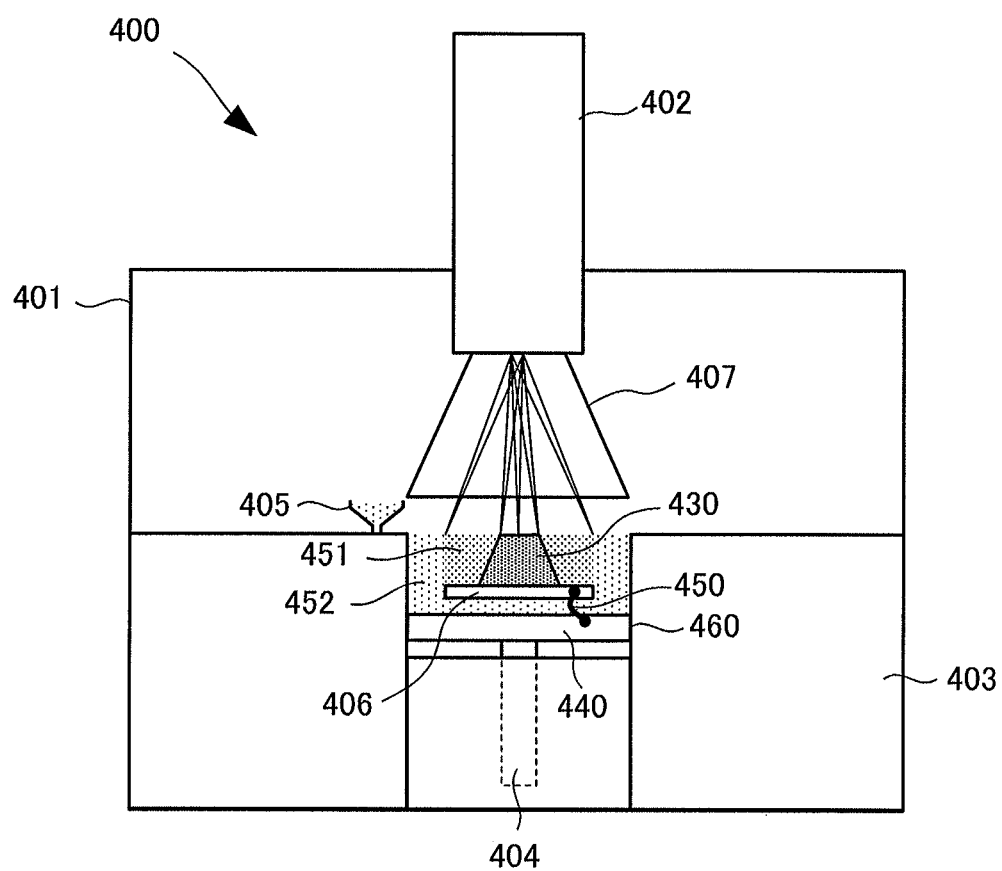
FIG. 4 is a view showing an example of the arrangement of a three-dimensional laminating and shaping apparatus according to the technical premise of the three-dimensional laminating and shaping apparatus according to the first embodiment of the present invention.

FIG. 4 is a view showing an example of the arrangement of a three-dimensional laminating and shaping apparatus according to the technical premise of the three-dimensional laminating and shaping apparatus according to this embodiment.

<<Arrangement>>

An electron gun 402 is attached to a vacuum vessel 401, and a shaping frame table (shaping box) 403 having a circular or square section is installed in the vacuum vessel 401. A Z-axis driving mechanism 404 is installed in a lower portion inside the shaping frame table 403, and capable of driving a powder table 440 in the Z direction by a rack-and-pinion, ball screw, or the like.

A heat-resistant flexible seal 460 is formed in the gap between the shaping frame table 403 and powder table 440, thereby giving slidability and sealability by the flexible seal 460 and the inner sliding surface of the shaping frame table 403. A vacuum pump (not shown) evacuates the vacuum vessel 401 and maintains the interior of the vacuum vessel 401 in a vacuum state.

On the powder table 440, a shaping plate (base plate) 406 on which a three-dimensional laminated and shaped object 430 is to be shaped is arranged in a state in which it is floated by a metal powder. To prevent electrical floating, the shaping plate 406 is grounded to the powder table 440 at a GND potential by a GND line 450. The three-dimensional laminated and shaped object 430 is shaped on the shaping plate 406. When shaping each layer, a linear funnel (recoater) 405 filled with a metal powder spreads the metal powder to almost the same height as that of the upper surface of the shaping frame table 403 (a spread powder 452).

A hopper (not shown) appropriately replenishes the metal powder to the linear funnel 405. The three-dimensional laminated and shaped object 430 is constructed by two-dimensionally melting the spread (unsintered) powder 452 in a one-layer region of the three-dimensional laminated and shaped object 430 by an electron beam from the electron gun 402, and overlaying the layers. A region of the powder 452 spread on the shaping plate 406 except for the three-dimensional laminated and shaped object 430 is a powder (spread (calcined) powder) 451 calcined by the electron beam from the electron gun 402, and has conductivity.

An anti-deposition cover 407 is attached between the shaping surface and electron gun 402, and prevents deposition of a metal vapor generated during shaping and deposition of metal sputtering by fireworks to the inner walls of the vacuum vessel 401.

<<Operation>>

The upper surface of the shaping plate 406 covered with the metal powder in three directions is set at almost the same height as that of the upper surface of the shaping frame table 403, and a region slightly narrower than the whole region of the upper surface of the shaping plate 406 is irradiated with the electron beam from the electron gun 402, thereby preheating the region to a temperature at which the metal powder is calcined.

When starting shaping, the Z-axis driving mechanism 404 slightly moves down the powder table 440 such that the upper surface of the shaping plate 406 is arranged in a position slightly lower than the upper surface of the shaping frame table 403. $\Delta Z$ as this slight lowering is equivalent to the layer thickness in the Z direction after that. The linear funnel 405 filled with the metal powder is moved to the opposite side along the upper surface of the shaping plate 406, and the region of $\Delta Z$ slightly narrower than the shaping plate 406 is irradiated with the electron beam from the electron gun 402, thereby heating the irradiated region, and reliably calcining the metal powder in the irradiated region.

In accordance with a two-dimensional shape obtained by slicing a prearranged designed three-dimensional laminated and shaped object at an interval of $\Delta Z$, this two-dimensional region is melted by the electron beam from the electron gun 402. After one layer is melted and solidified, the region slightly narrower than the shaping plate 406 is irradiated with the electron beam from the electron gun 402 again, thereby heating the irradiated region, and preparing for spreading of the powder.

After the irradiated region is heated to a predetermined temperature, the electron beam is turned off, the Z-axis driving mechanism 404 moves down the powder table 440 by $\Delta Z$, and the linear funnel 405 is moved to the opposite side along the upper surface of the shaping frame table 403 again. Then, the metal powder is spread on the preceding layer by $\Delta Z$ and reliably calcined by the electron beam from the electron gun 402, and a two-dimensional-shape region corresponding to the layer is melted. The three-dimensional laminated and shaped object 430 is shaped by repeating this process.

Figure 5:
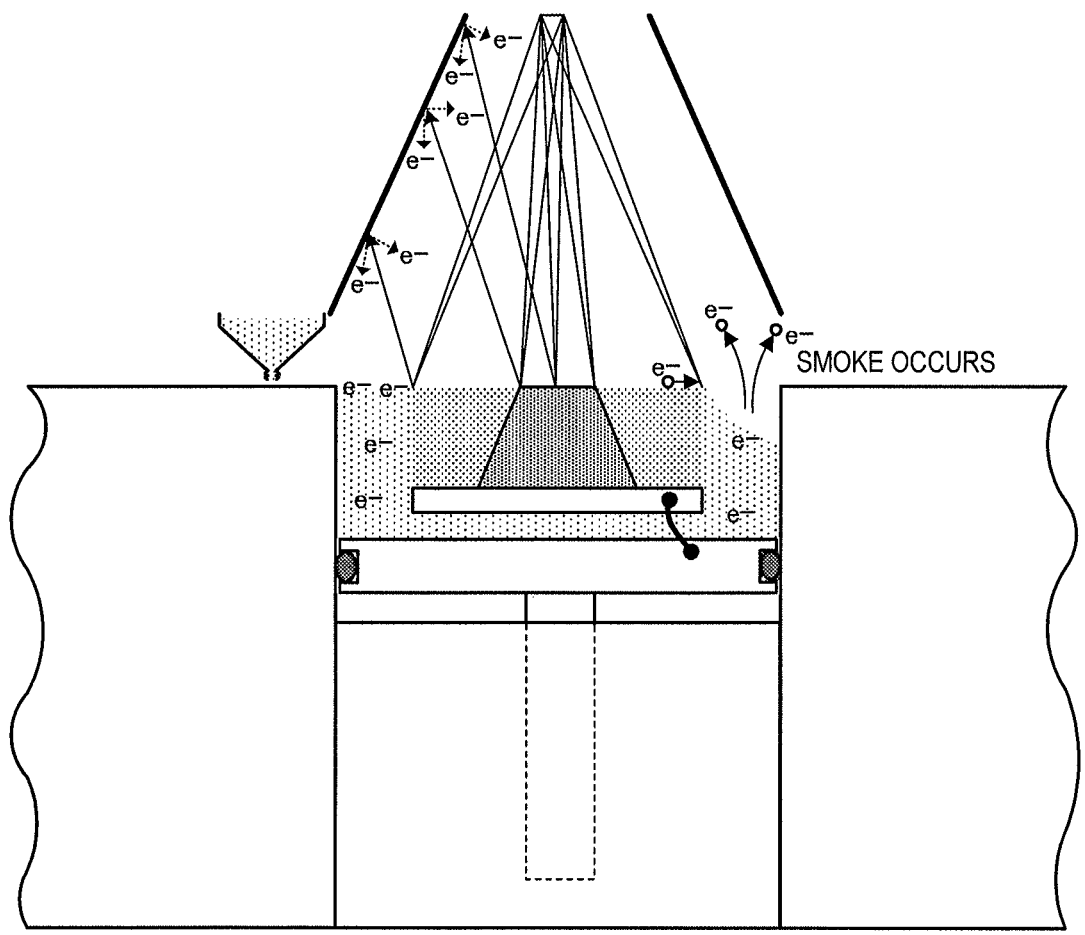
FIG. 5 is a view for explaining a mechanism of generating a smoke phenomenon by the three-dimensional laminating and shaping apparatus according to the technical premise of the three-dimensional laminating and shaping apparatus according to the first embodiment of the present invention.

FIG. 5 is a view for explaining a mechanism of generating a smoke phenomenon by the three-dimensional laminating and shaping apparatus according to the technical premise of the three-dimensional laminating and shaping apparatus according to this embodiment. FIG. 5 is an enlarged view of a portion below the electron gun 402 shown in FIG. 4. As shown in FIG. 5, when the electron beam is emitted for calcination or melting, a large amount of backscattered electrons and secondary electrons are generated from the irradiation position. The backscattered electrons collide against the inner walls of the anti-deposition cover 407 above the irradiation position, thereby further emitting backscattered electrons and secondary electrons.

As described above, a large amount of electrons exist above the shaping surface covered with the anti-deposition cover 407, and an uncalcined metal powder is easily negatively charged because individual powder particles are electrically insulated by the surface oxide film. Therefore, if a charged metal powder forms due to insufficient calcination in a region to be irradiated with the electron beam, the charged metal powder is blown off to the outside unsintered region, and the charge balance breaks down in that region. If the charge balance breaks down, the repulsive force balance obtained by the electrostatic force also breaks down, and the metal powder particles scatter by repulsion, i.e., a smoke phenomenon occurs. To suppress this, a method expecting neutralization by generating gas ions by supplying a gas such as He gas is used. However, the smoke phenomenon still occurs if calcination is insufficient.

<Technique of this Embodiment>
<<Arrangement>>

Figure 1:
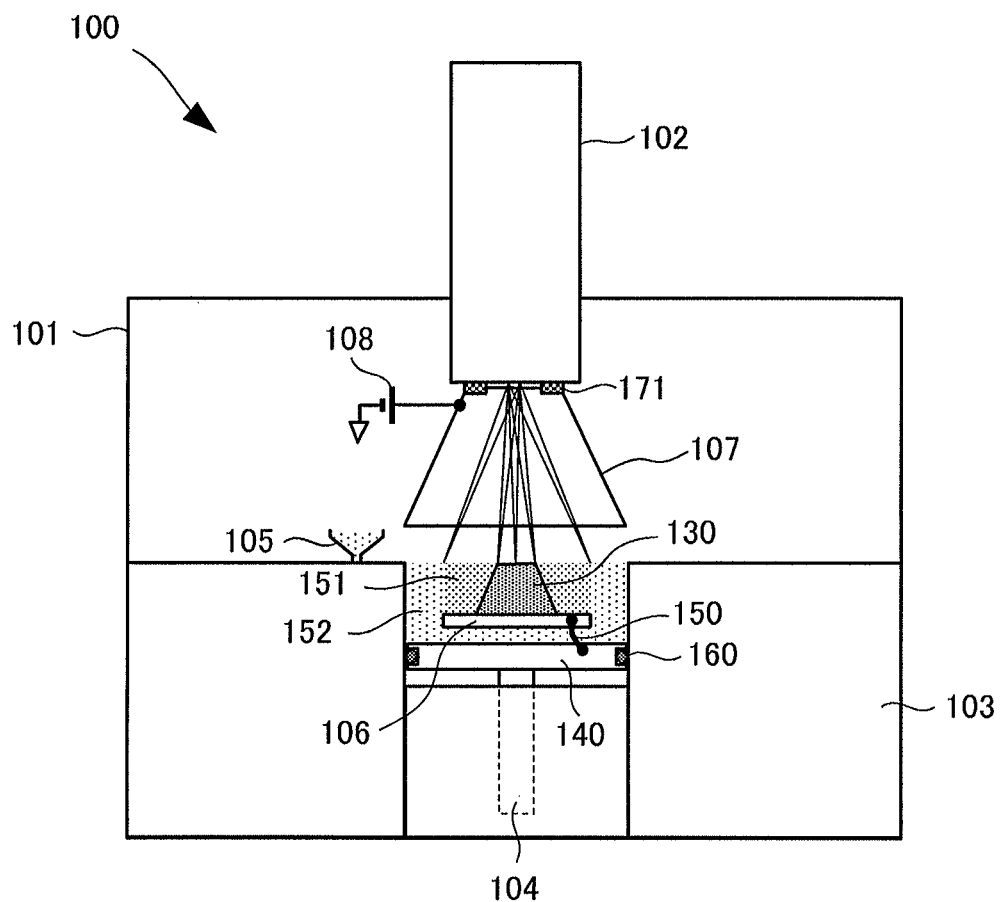
FIG. 1 is view showing the arrangement of a three-dimensional laminating and shaping apparatus according to the first embodiment of the present invention.
Figure 2:
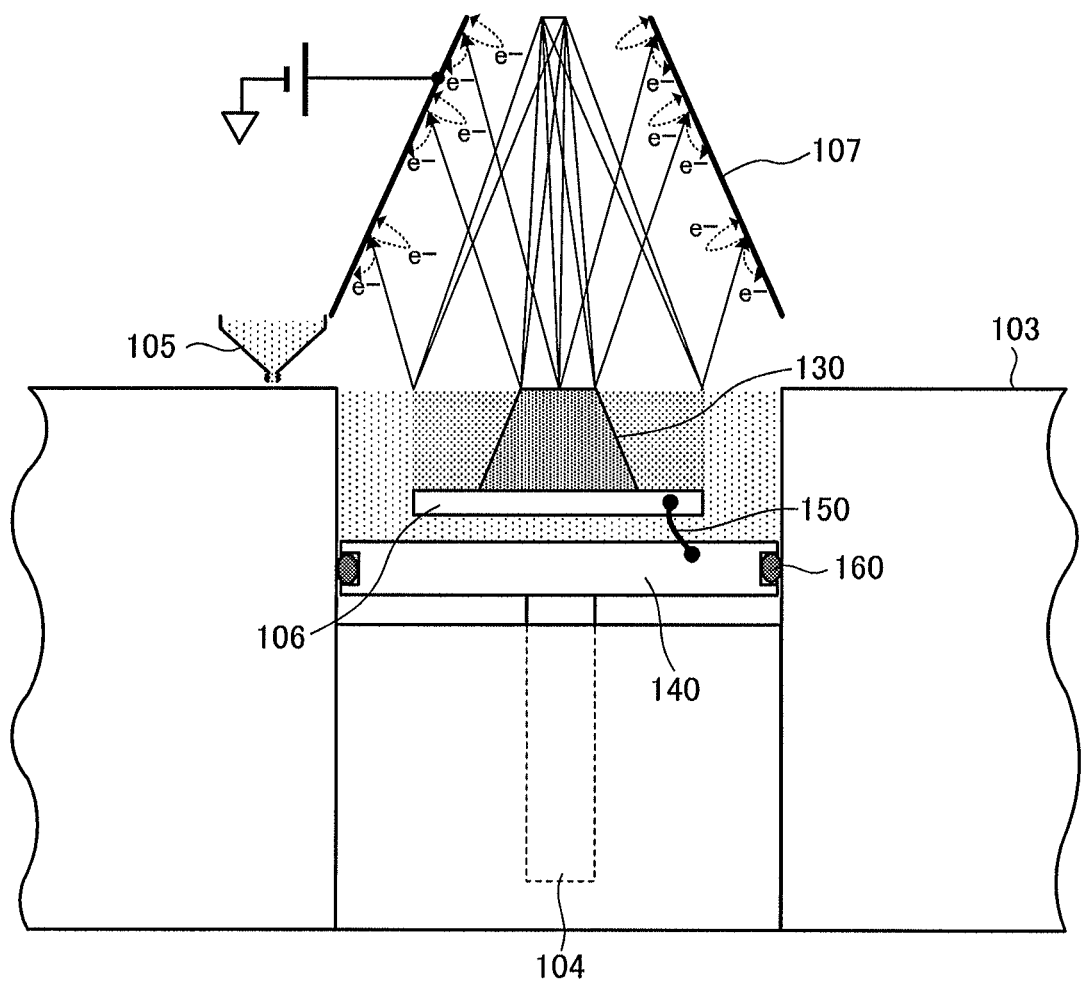
FIG. 2 is a partially enlarged view showing the arrangement of the three-dimensional laminating and shaping apparatus according to the first embodiment of the present invention.

FIG. 1 is a view showing the arrangement of the three-dimensional laminating and shaping apparatus according to this embodiment. FIG. 2 is a partially enlarged view showing the arrangement of the three-dimensional laminating and shaping apparatus according to this embodiment. The three-dimensional laminating and shaping apparatus 100 includes a vacuum vessel 101, an electron gun 102, a shaping frame table 103, a Z-axis driving mechanism 104, a linear funnel 105, a shaping plate 106, an anti-deposition cover 107, and a DC power supply 108. Note that the three-dimensional laminating and shaping apparatus 100 will be explained below by taking a powder bed type shaping apparatus as an example.

The anti-deposition cover 107 is a metal cover, attached to the distal end portion of the electron gun 102, and electrically floated by an insulator 171. Also, the positive DC power supply 108 is externally connected to the anti-deposition cover 107, and applies a voltage of +30 [V] or more, preferably, a voltage of +50 to +100 [V] to the anti-deposition cover 107. It is also possible to set the anti-deposition cover 107 at a GND potential, instead of applying the positive voltage.

Note that in FIG. 1, an example in which the DC power supply 108 is arranged in the vacuum vessel 101 is explained. However, it is also possible to arrange the DC power supply 108 outside vacuum, and supply an application voltage via field-through. Furthermore, typical examples of the material of the anti-deposition cover 107 are a metal such as titanium (Ti), a titanium-based compound, and an alloy such as stainless steel. However, the material is not limited to them as long as the material emits no large amount of secondary electrons. In addition, the thickness of the anti-deposition cover 107 is about 0.5 mm, but is not limited to this, and may also be smaller or larger than this.

<<Operation>>

The upper surface of the shaping plate 106 covered with the metal powder in three directions is set at almost the same height as that of the upper surface of the shaping frame table 103, thereby covering the metal powder between the shaping plate 106 and shaping frame table 103. The whole region of the upper surface of the shaping plate 106 is irradiated with the electron beam from the electron gun 102, thereby preheating the shaping plate 106 to a temperature at which the metal powder is completely calcined.

When starting shaping, the Z-axis driving mechanism 104 moves down the shaping table 140 so that the upper surface of the shaping plate 106 is arranged in a position slightly lower than the upper surface of the shaping frame table 103. $\Delta Z$ as this slight lowering is equivalent to the layer thickness in the Z direction after that.

The linear funnel (recoater) 105 as a material recoater filled with the metal powder is moved to the opposite side along the upper surface of the shaping plate 106, and the metal powder corresponding to $\Delta Z$ is recoated and spread on and around the shaping plate 106. The metal powder spread on the shaping plate 106 is irradiated with the electron beam from the electron gun 102, thereby heating the irradiated region, and reliably calcining the metal powder in the irradiated region.

In accordance with a two-dimensional shape obtained by slicing a prearranged designed three-dimensional laminated and shaped object (shaped model) at an interval of $\Delta Z$, this two-dimensional-shape region is melted by the electron beam from the electron gun 102. After one layer is melted and solidified, the region slightly narrower than the shaping plate 106 is irradiated with the electron beam from the electron gun 102 again, thereby heating the irradiated region, and preparing for spreading of the metal powder. After the irradiated region is heated to a predetermined temperature, the electron beam is turned off.

The Z-axis driving mechanism 104 moves down the powder table 140 by $\Delta Z$, the linear funnel 105 is moved to the opposite side along the upper surface of the shaping frame table 103 again, and the metal powder is spread on the preceding layer by $\Delta Z$. After the newly spread metal powder is irradiated with the electron beam from the electron gun 102 and reliably calcined, a two-dimensional-shape region corresponding to the layer is melted. The three-dimensional laminating and shaping apparatus 100 shapes a three-dimensional laminated and shaped object 130 by repeating this process.

By applying a positive voltage to the anti-deposition cover 107, secondary electrons (a few to a few ten eV) which generate a large amount of electrons can be trapped in the anti-deposition cover 107. This suppresses charge-up of the metal powder in the unsintered region between the shaping plate 106 and shaping frame table 103.

FIG. 3 is a flowchart for explaining the procedure of the three-dimensional laminating and shaping apparatus 100 according to this embodiment. In step S301, the three-dimensional laminating and shaping apparatus 100 acquires shaping data of the three-dimensional laminated and shaped object 130. In step S303, the three-dimensional laminating and shaping apparatus 100 recoats and spreads the metal powder on the shaping surface. Note that before recoating the metal powder on the shaping surface, the base plate is preheated to a calcination temperature. In step S305, the three-dimensional laminating and shaping apparatus 100 applies a predetermined voltage to the anti-deposition cover 107. In step S307, the three-dimensional laminating and shaping apparatus 100 performs calcination by irradiating the recoated metal powder with an electron beam. In step S309, the three-dimensional laminating and shaping apparatus 100 performs final melting by irradiating the calcined metal powder with the electron beam. In step S311, the three-dimensional laminating and shaping apparatus 100 determines whether shaping of the three-dimensional laminated and shaped object 130 is complete. If the three-dimensional laminating and shaping apparatus 100 determines that shaping of the three-dimensional laminated and shaped object 130 is complete (YES in step S311), the three-dimensional laminating and shaping apparatus 100 terminates the shaping. If the three-dimensional laminating and shaping apparatus 100 determines that shaping is not complete (NO in step S311), the three-dimensional laminating and shaping apparatus 100 repeats the steps from step S303.

In this embodiment, a material which generates no large amount of secondary electrons is used, and a positive voltage is applied to the anti-deposition cover. Therefore, the generation of secondary electrons can effectively be suppressed. Also, since the generation of secondary electrons is suppressed, it is possible to suppress charge-up of the metal powder in an unsintered region, and suppress the occurrence of a smoke phenomenon.

Second Embodiment

Figure 6:
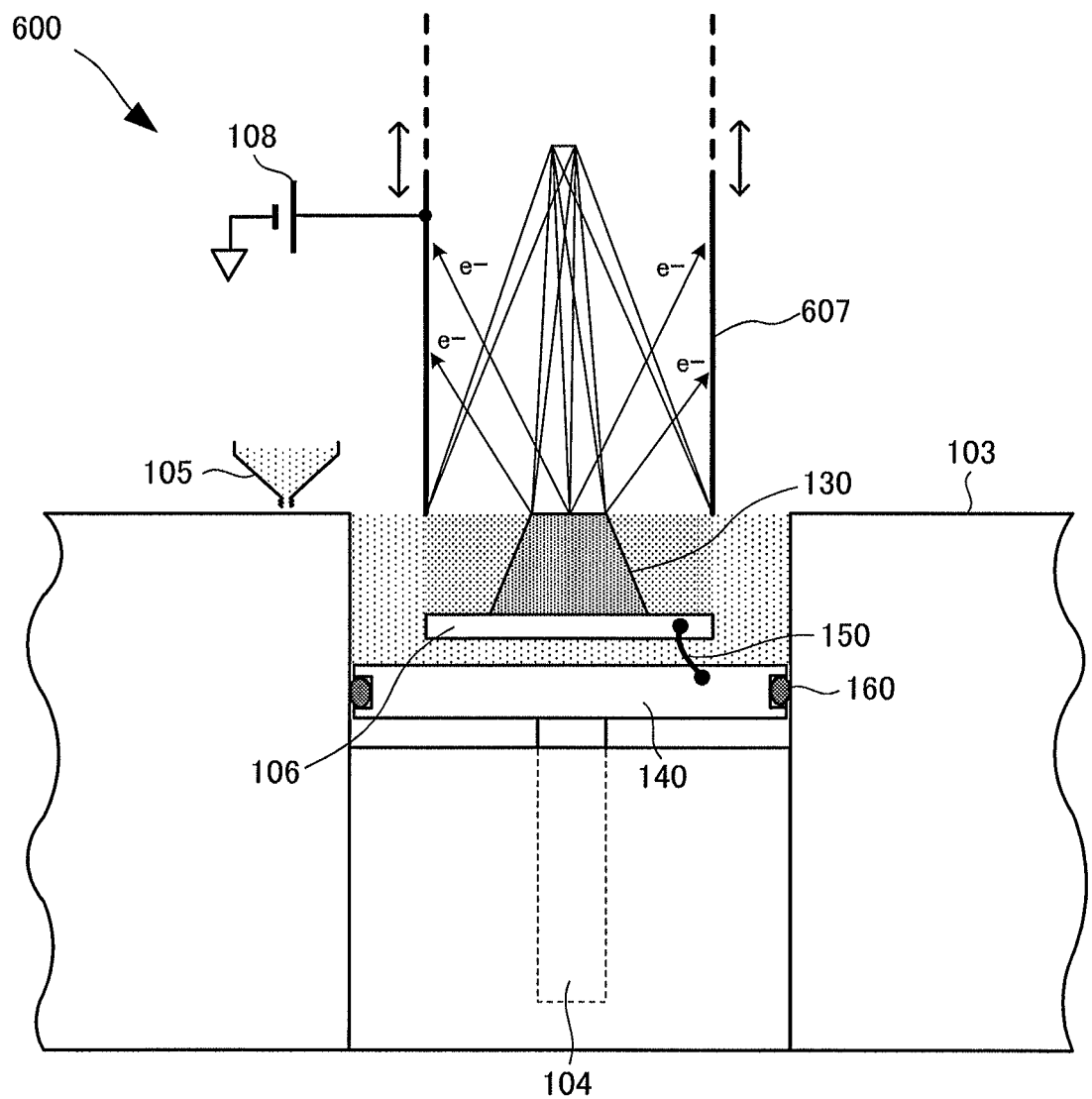
FIG. 6 is a partially enlarged view showing the arrangement of an anti-deposition cover of a three-dimensional laminating and shaping apparatus according to the second embodiment of the present invention.

Next, a three-dimensional laminating and shaping apparatus according to the second embodiment of the present invention will be explained with reference to FIG. 6. FIG. 6 is a view for explaining the arrangement of an anti-deposition cover of a three-dimensional laminating and shaping apparatus 600 according to this embodiment. An anti-deposition cover 607 is arranged perpendicularly to a shaping frame table 103. When a linear funnel 105 recoats and spreads a metal powder on a shaping surface, the anti-deposition cover 607 is moved up to give a passing space to the linear funnel 105. When a new metal powder is spread by the linear funnel 105 by recoating the metal powder of one layer, the anti-deposition cover 607 is moved down to a position where the anti-deposition cover 607 is in contact with the recoated metal powder, and an electron beam is emitted. Consequently, no electron beam arrives at an unsintered portion which is not to be irradiated with the electron beam, so charge-up of the unsintered portion can be suppressed.

This embodiment can suppress the generation of secondary electrons by using a material which emits no large amount of secondary electrons, and applying a positive voltage to the anti-deposition cover.

Third Embodiment

Figure 7:
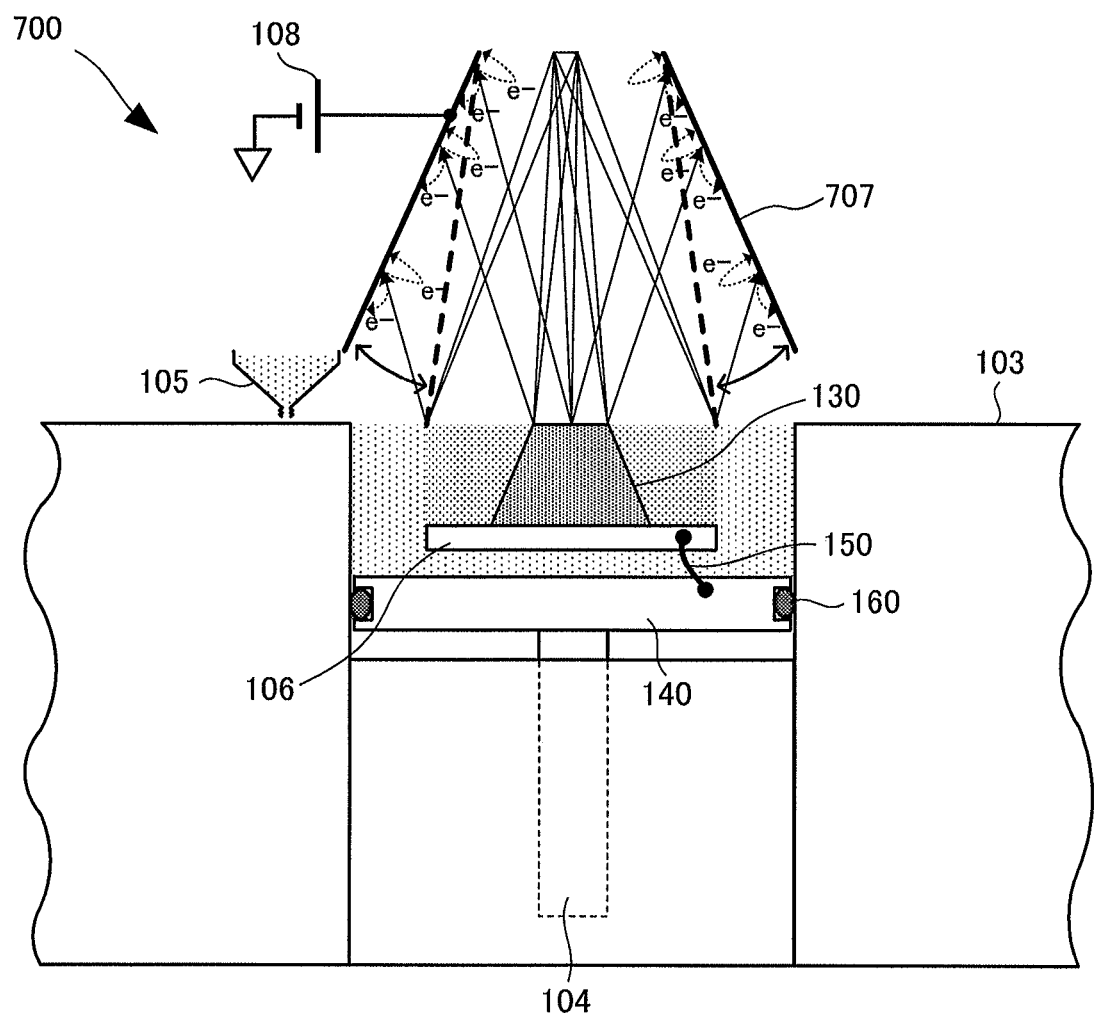
FIG. 7 is a partially enlarged view showing the arrangement of an anti-deposition cover of a three-dimensional laminating and shaping apparatus according to the third embodiment of the present invention.

A three-dimensional laminating and shaping apparatus according to the third embodiment of the present invention will be explained below with reference to FIG. 7. FIG. 7 is a view for explaining the arrangement of an anti-deposition cover of a three-dimensional laminating and shaping apparatus 700 according to this embodiment. An anti-deposition cover 707 has a conical shape, and has a large opening near a shaping frame table 103.

The anti-deposition cover 707 is movable and leaps up when a liner funnel 105 spreads a metal powder on a shaping surface, and the linear funnel 105 moves in a space between the anti-deposition cover 707 and shaping surface. When emitting an electron beam, the anti-deposition cover 707 moves down (the dotted lines in FIG. 7), so that only a portion above a shaping plate 106 is irradiated with the electron beam.

This embodiment can suppress the generation of secondary electrons by using a material which emits no large amount of secondary electrons, and applying a positive voltage to the anti-deposition cover.

Fourth Embodiment

Figure 8A:
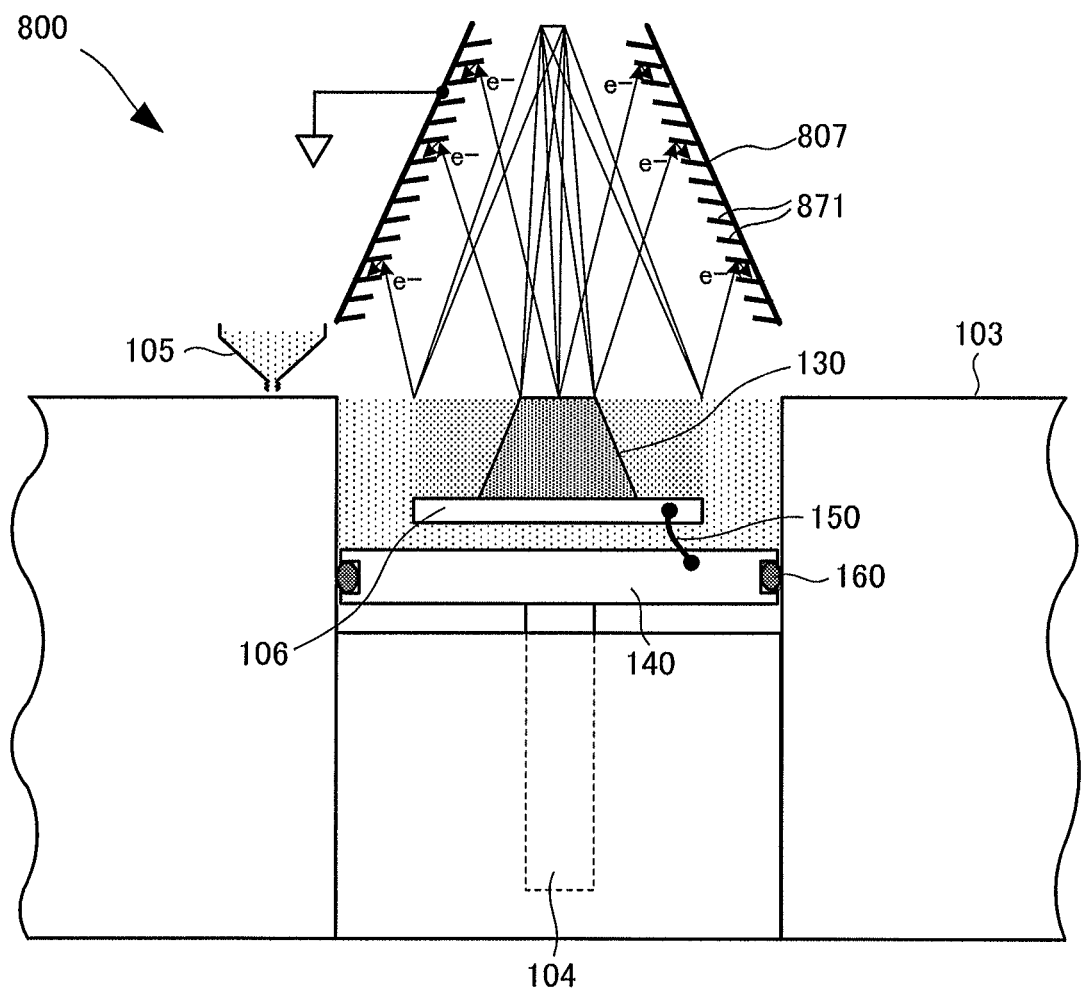
FIG. 8A is a partially enlarged view showing the arrangement of an anti-deposition cover of a three-dimensional laminating and shaping apparatus according to the fourth embodiment of the present invention.
Figure 8B:
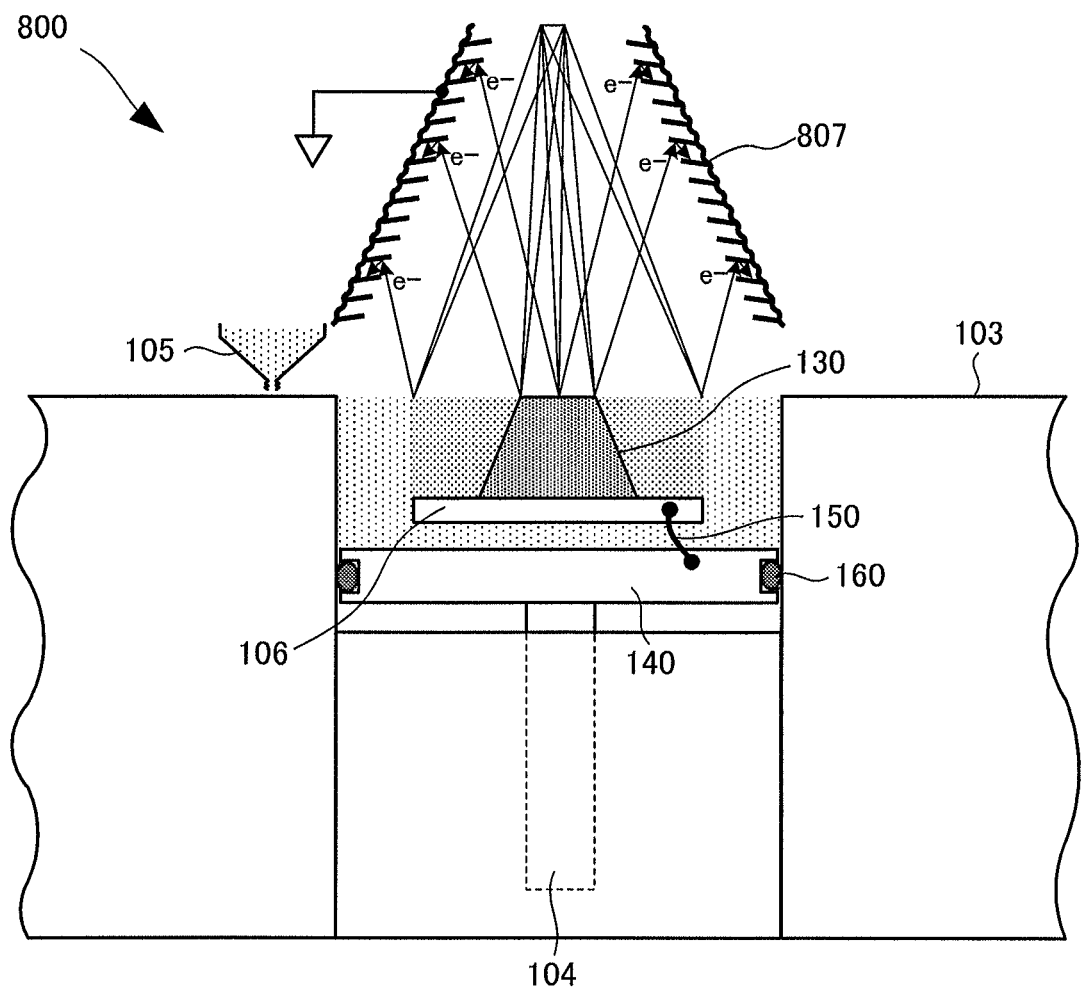
FIG. 8B is a partially enlarged view showing the arrangement of another example of the anti-deposition cover of the three-dimensional laminating and shaping apparatus according to the fourth embodiment of the present invention.

A three-dimensional laminating and shaping apparatus according to the fourth embodiment of the present invention will be explained below with reference to FIG. 8. FIG. 8A is a view for explaining the arrangement of an anti-deposition cover of a three-dimensional laminating and shaping apparatus 800 according to this embodiment. FIG. 8B is a view for explaining the arrangement of another example of the anti-deposition cover of the three-dimensional laminating and shaping apparatus 800 according to this embodiment.

As shown in FIG. 8A, an anti-deposition cover 807 has a structure including fins 871 inside. The material of the fins 871 can be the same as or different from the material of the anti-deposition cover 807. Also, an attachment angle at which the fins 871 are attached to the anti-deposition cover 807 can be either an acute angle or obtuse angle, and can also be an arbitrary angle. By thus combining the anti-deposition cover 807 and fins 871, the surface area of a mechanism for trapping backscattered electrons and secondary electrons increases, so more backscattered electrons and secondary electrons can be trapped.

Furthermore, to increase the surface area of the anti-deposition cover 807, as shown in FIG. 8B, the surface area of the trap mechanism can further be increased by giving a wave-like shape to the anti-deposition cover, and combining the anti-deposition cover 807 with the fins 871. Note that the shape of the anti-deposition cover 807 is not limited to the wave-like shape, and may also be a stepwise shape, zigzag shape, or the like.

Note also that the fins 871 may all have the same length or may have different lengths, and the length of the fin 871 nearest to the shaping surface may be made larger than those of other fins 871. In addition, the anti-deposition cover 807 has a GND potential, but it is also possible to apply a positive voltage to the anti-deposition cover 807 as in the abovementioned second embodiment and the like.

In this embodiment, the surface area of the trap mechanism for trapping backscattered electrons and secondary electrons can be increased. Accordingly, it is possible to trap more backscattered electrons and secondary electrons, and suppress the occurrence of a smoke phenomenon.

Fifth Embodiment

A three-dimensional laminating and shaping apparatus according to the fifth embodiment of the present invention will be explained below with reference to FIG. 9. FIG. 9 is a view for explaining the arrangement of an anti-deposition cover of the three-dimensional laminating and shaping apparatus 900 according to this embodiment. An anti-deposition cover 907 has a GND-potential ground portion 971 inside.

When a voltage to be applied to the anti-deposition cover 907 is increased, an electric field is formed in a space through which an electron beam passes. Consequently, the shape of the electron beam collapses, the accuracy of the spot position decreases, or the accuracy of the scan position decreases. In this embodiment, therefore, the ground portion 971 is formed inside the anti-deposition cover 907, and the electric field from the anti-deposition cover 907 is fixed to the GND level by the ground portion 971. Although not shown in FIG. 9, the ground portion 971 is attached to be electrically floated from the anti-deposition cover 907 by an insulator.

In this embodiment, the ground portion is formed, and this makes it possible to trap secondary electrons and backscattered electrons generated from the anti-deposition cover, thereby reducing scattered electrons near a shaping surface. In addition, it is possible to suppress charge-up of a metal powder in an unsintered region, and suppress the occurrence of a smoke phenomenon.

OTHER EMBODIMENTS

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention is applicable to a system including a plurality of devices or a single apparatus. The present invention is also applicable even when an information processing program for implementing the functions of the embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described embodiments.

The invention claimed is:

1. A three-dimensional laminating and shaping apparatus comprising:
    a material recoater that recoats a material of a three-dimensional laminated and shaped object onto a shaping surface on which the three-dimensional laminated and shaped object is to be shaped;
    an electron gun that generates an electron beam;
    a metal cover formed between the shaping surface and said electron gun;
    an application unit that applies a positive voltage to said cover or sets said cover at a ground potential; and
    a plurality of fins formed inside said cover, wherein the metal cover is in a funnel shape, wherein each of the plurality of fins is formed along an inside surface of the metal cover at an angle, and wherein a distance between each of the plurality of fins and a vertical center axis of the metal cover increases as each of the plurality of fins gets closer to the shaping surface.

2. The three-dimensional laminating and shaping apparatus according to claim 1, wherein the positive voltage is not less than 30 [V].

3. The three-dimensional laminating and shaping apparatus according to claim 2, wherein the positive voltage is 50 to 100 [V].

4. The three-dimensional laminating and shaping apparatus according to claim 1, further comprising a GND-potential ground portion formed inside said cover.

5. The three-dimensional laminating and shaping apparatus according to claim 1, wherein said cover has a wave-like shape.

6. A control method of a three-dimensional laminating and shaping apparatus including:
    a material recoater that recoats a material of a three-dimensional laminated and shaped object onto a shaping surface on which the three-dimensional laminated and shaped object is to be shaped;
    an electron gun that generates an electron beam;
    a metal cover formed between the shaping surface and said electron gun;
    an application unit that applies a positive voltage to said cover or sets said cover at a ground potential; and
    a plurality of fins formed inside said cover, wherein the metal cover is in a funnel shape, wherein each of the plurality of fins is formed along an inside surface of the metal cover at an angle, and wherein a distance between each of the plurality of fins and a vertical center axis of the metal cover increases as each of the plurality of fins gets closer to the shaping surface,
    the method comprising:
    recoating a material of a three-dimensional laminated and shaped object onto a shaping surface on which the three-dimensional laminated and shaped object is to be shaped;
    generating an electron beam; and
    applying a positive voltage to a metal cover or setting said metal cover at a ground potential, wherein said metal cover formed between the shaping surface and the electron gun, and a fin is formed inside said metal cover.

7. A non-transitory computer readable medium storing a control program of a three-dimensional laminating and shaping apparatus including:
    a material recoater that recoats a material of a three-dimensional laminated and shaped object onto a shaping surface on which the three-dimensional laminated and shaped object is to be shaped;
    an electron gun that generates an electron beam;
    a metal cover formed between the shaping surface and said electron gun;
    an application unit that applies a positive voltage to said cover or sets said cover at a ground potential; and
    a plurality of fins formed inside said cover, wherein the metal cover is in a funnel shape, wherein each of the plurality of fins is formed along an inside surface of the metal cover at an angle, and wherein a distance between each of the plurality of fins and a vertical center axis of the metal cover increases as each of the plurality of fins gets closer to the shaping surface,
    the control program for causing a computer to execute a method, comprising:
    recoating a material of a three-dimensional laminated and shaped object onto a shaping surface on which the three-dimensional laminated and shaped object is to be shaped;
    generating an electron beam; and
    applying a positive voltage to a metal cover or setting said metal cover at a ground potential, wherein said metal cover is formed between the shaping surface and the electron gun; and a fin is formed inside said metal cover.

* * * * *

UNITED STATES PATENT AND TRADEMARK OFFICE
CERTIFICATE OF CORRECTION

PATENT NO. : 10,583,517 B2
APPLICATION NO. : 15/122836
DATED : March 10, 2020
INVENTOR(S) : Shinichi Kitamura et al.

Page 1 of 1

It is certified that error appears in the above-identified patent and that said Letters Patent is hereby corrected as shown below:

On the Title Page

Column 1, Item (54), title and in the Specification at Column 1, Line 3:
Delete "THREE-DIMENSIONAL LAMINATING AND SHAPING APPARATUS, THREE-DIMENSIONAL LAMENTING AND SHAPING APPARATUS CONTROL METHOD, AND THREE-DIMENSIONAL LAMINATING AND SHAPING APPARATUS CONTROL PROGRAM"

Insert --THREE-DIMENSIONAL LAMINATING AND SHAPING APPARATUS, THREE-DIMENSIONAL LAMINATING AND SHAPING APPARATUS CONTROL METHOD, AND THREE-DIMENSIONAL LAMINATING AND SHAPING APPARATUS CONTROL PROGRAM--

Signed and Sealed this
First Day of December, 2020

Andrei Iancu
*Director of the United States Patent and Trademark Office*